Jan. 9, 1934.  R. L. JENKINS  1,942,926
COMPOSITION CONTAINING CHLORINATED DIPHENYL AND NITROCELLULOSE
Filed May 25, 1931  3 Sheets-Sheet 2

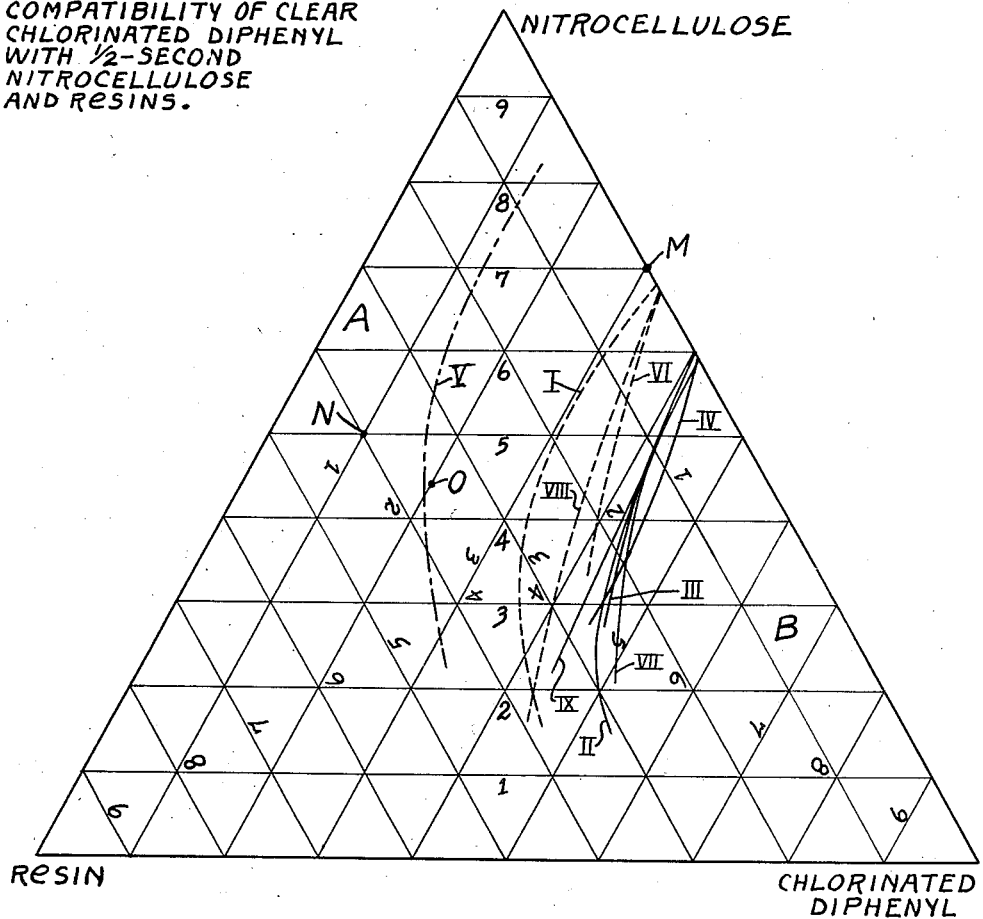

| CURVE NO. | RESIN | % CHLORINE IN CLEAR CHLORINATED DIPHENYL | SOLVENT NO. |
|---|---|---|---|
| X | ESTER GUM | 62 | 1 |
| XI | ESTER GUM | 54 | 1 |
| XII | ESTER GUM | 54 | 4 |
| XIII | AMBEROL 200-B | 54 | 1 |

*Fig. 2*

COMPATIBILITY OF CLEAR CHLORINATED DIPHENYL WITH ½-SECOND NITROCELLULOSE AND RESINS.

A = AREA OF COMPATIBLE COMPOSITIONS.
B = AREA OF NON-COMPATIBLE COMPOSITIONS.

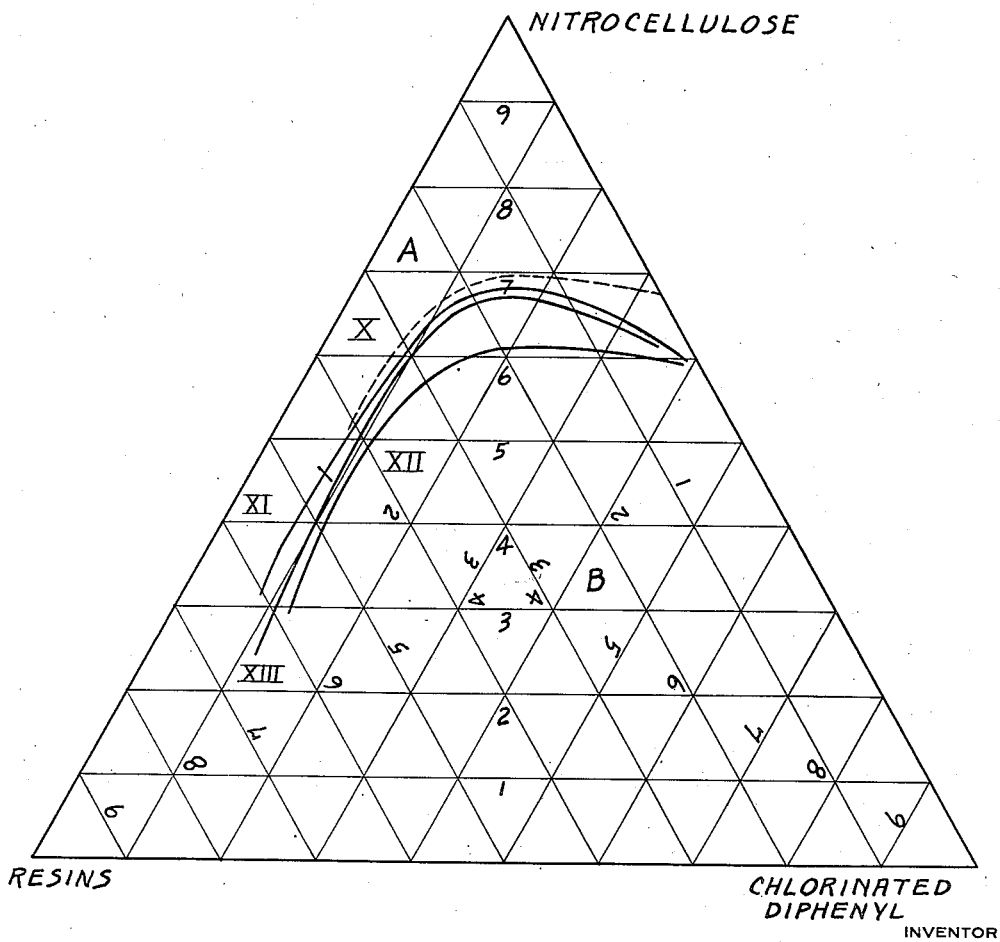

INVENTOR
Russell L. Jenkins
BY
ATTORNEYS

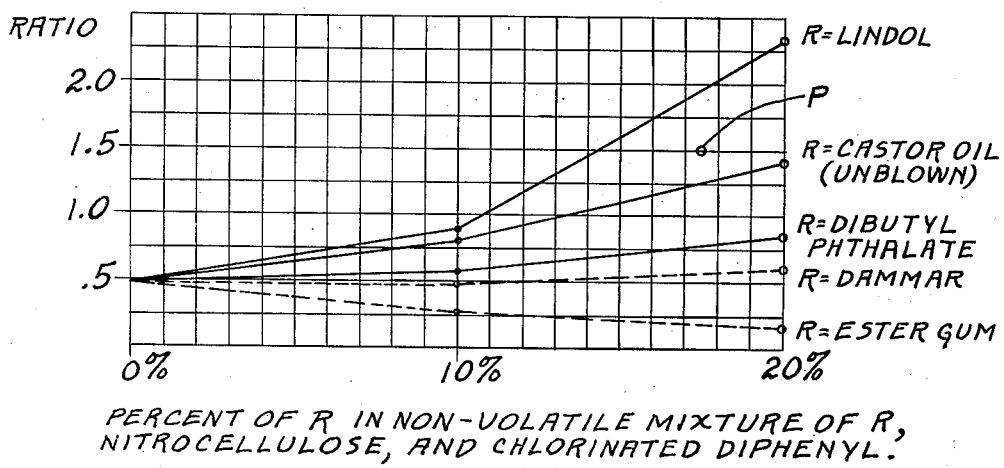
Fig. 3 RELATIVE EFFECTIVENESS OF LINDOL, CASTOR OIL AND DIBUTYL PHTHALATE IN INCREASING THE LIMITING COMPATIBLE RATIO OF CLEAR CHLORINATED DIPHENYL CONTAINING 62% CHLORINE TO ½-SECOND NITROCELLULOSE.
(FILM AGED TWO DAYS)

Patented Jan. 9, 1934

1,942,926

UNITED STATES PATENT OFFICE 1,942,926

COMPOSITION CONTAINING CHLORINATED DIPHENYL AND NITROCELLULOSE

Russell L. Jenkins, Anniston, Ala., assignor to Swann Research, Incorporated, a corporation of Alabama Application May 25, 1931. Serial No. 539,844

14 Claims. (Cl. 134—79)

My invention relates to coating compositions or lacquers having a nitrocellulose base. One object of my invention is to produce such a clear or pigmented lacquer having as one of its principal components chlorinated diphenyl or chlorinated derivatives thereof, which shall have a low viscosity and will produce a film having good hardness and abrasion resistance, good adhesion to metal or other surfaces and good water, alkali, and oxidation resistance. Another object of my invention is to produce such a coating composition having a retarded flammability as such and also as a film. Still another object of my invention is to provide a new and improved type of plasticizer or plasticizer-resin for nitro-cellulose lacquers or plastics.

I have discovered that nitrocellulose and chlorinated diphenyl may be combined with or without natural or synthetic resins or with or without plasticizers and produce lacquers or other plastic masses or coating materials with very desirable properties.

One important feature of my invention I have found to reside in the ability to formulate various new and useful lacquers, although it is by no means limited to this class of protective coatings, since I have found it possible to apply my invention to the formulation of nitrocellulose containing plastics or dopes for the production of solid or semi-solid and more or less flexible masses which are useful in the manufacture of floor coverings, artificial leather art objects and other plastic masses, particularly where retarded flammability is desired.

Another important feature of my invention resides in the increased resistance to oxidation and embrittlement offered by chlorinated diphenyl containing lacquers. This is particularly marked where the lacquered surface is exposed to strong oxidizing influences, such as by ozone generated by high tension electrical discharges, my improved lacquers under these conditions affording increased protection to rubber or other similar oxidizable material upon which it is coated.

In the accompanying drawings,

Figs. 1, 2 and 3 illustrate graphically what is commonly known as the compatibility relationships existing between various two- and three-component systems comprised of ½-second nitrocellulose, two types of chlorinated diphenyl and two types of resin. The diagrams, of course, represent only the composition of the non-volatile part of the lacquer, i. e., the resin, nitrocellulose, and the chlorinated diphenyl or the latter two only. The lacquer as compounded, contains also a volatile part, the latter being referred to as the solvent.

Compatibility relationships such as those illustrated are obtained by combining dilute (15%) solutions of the three ingredients (nitrocellulose, resin, and chlorinated diphenyl) or any two of these three ingredients, dissolved in amyl acetate and by applying the lacquer thus formed to a bright metal strip and allowing it to dry slowly at ordinary temperature. After drying for, say, 24 hours, the test strip is examined for blushing and hardness and possibly other properties, as gloss, such as are desired in a finished lacquer. The results of these observations are recorded on triangular diagrams, and enable one to determine at a glance the range of composition of lacquers having the properties desired.

The data recorded in Fig. 1 gives the results of certain of my experiments which were directed to determining the blushing or compatibility relation in this series of lacquers. Data observed as to hardness, gloss, water resistance, etc., may be similarly recorded.

As examples of the way in which chlorinated diphenyl may be used as a constituent of nitro-cellulose lacquers, I cite the following:—

The several constituents which may be used in my improved lacquer comprise resins of various kinds, chlorinated diphenyl, nitrocellulose and a suitable solvent. In addition, a plasticizer may be required in some cases. These several constituents are separately discussed hereinafter in this specification and examples given as to typical methods of procedure.

Resins

The resin or gum constituent may be one or more than one of the following: dammar, shellac, copal, rosin pontianac, polymerized vinyl acetate, amberol, rezyl, kopol, ester gum, or glyptal. The first five of these are natural resins and are particularly well known to the varnish maker. The remainder are classed as synthetic resins. The synthetic resins mentioned above with the exception of ester gum have only recently appeared on the market and are less well known. Kopol is a synthetic resin of unknown composition. Vinyl acetate resin has been described by Ellis in his book "Synthetic Resins and Their Plastics", 1st. Ed., page 300, and also by Barry, Drummond and Morrell in "Natural and Synthetic Resins" (1926), page 136. Amberol is a phenol-formaldehyde resin. Rezyl and glyptal are modifications of the phthalic anhydride resins, the latter having been described by Ellis, page 293.

Dammar, as obtained on the market, usually contains appreciable amounts of wax, which substance is unsuitable as a lacquer component, hence it is desirable to de-wax it before use. This is accomplished by dissolving 1000 parts of crude dammar in 1000 parts of benzol. An approximately equal amount of ethyl alcohol is added which precipitates the wax. This is then filtered off and the filtrate distilled to remove the solvent. The molten dammar residue remaining after removing the solvent is poured into shallow pans and allowed to cool. Further removal of solvent may be accomplished by drying in a vacuum oven at low temperatures.

Resins such as these may be used as a 25 or a 50% solution in the mixed solvent hereinafter mentioned.

Chlorinated diphenyl

In compounding my improved lacquers, chlorinated diphenyl may be employed either as a plasticizer or softener or it may be employed as a resin. In the examples to follow its use in both capacities is illustrated. Chlorinated diphenyl ranging in chlorine content from 15 to 68% may be used, although for most purposes a product containing between 50 and 62% chlorine is more desirable. Where the chlorinated diphenyl is employed as a resin, it is preferable to employ the higher chlorine content. For compositions in which the color of the unpigmented lacquer is of no importance, chlorinated diphenyl which has been chlorinated in the presence of iron and which is black or dark colored may be used after it has been freed of iron and hydrochloric acid by washing. For clear lacquers, chlorinated diphenyl which has been distilled or which has been chlorinated in the presence of iodine as a chlorination catalyst is most suitable. The introduction of the chlorinated diphenyl in the lacquer is preferably made by first making a solution of this substance in the solvent, which solution may contain, say, from 25 to 50% of chlorinated diphenyl. The appropriate amount of this solution is then used as hereinafter indicated.

Nitrocellulose

This ingredient may vary greatly in viscosity and in making lacquers I prefer to use low viscosity nitrocellulose, say, of the ½-second grade. In the production of other plastic masses, it may be desirable to use higher viscosity cotton, depending on the degree of strength and workability desired, or it may be desirable to combine low and high viscosity nitrocellulose, thus obtaining in the plastic the advantage of a high nitrocellulose content from the low viscosity cotton and strength and workability from the high viscosity cotton.

When formulating lacquers for brushing, spraying, or dipping purposes, it is desirable to dissolve the nitrocellulose in the mixed solvent mixture to make a 20 to 25% solution.

Solvents

The solvents used in formulating nitrocellulose lacquers have been classified by Hofmann in Journal of Industrial and Engineering Chemistry for February, 1931, on page 129. These solvents are used in mixtures in various proportions and various theories have been advanced concerning the proper combinations of solvents to use for specific lacquer applications. In formulating my chlorinated diphenyl containing lacquers, I may also use the various combinations of solvents which have been proposed and in general it may be said that in making a choice of solvents for my lacquers the well known principles governing the choice of a solvent apply to these lacquers as well. Having in mind the various combinations of solvents which may be used, I will illustrate various lacquer formulæ in which several solvent mixtures are used.

In Figs. 1 and 2 and in the examples the solvent used is indicated by a solvent number. The composition of the solvent corresponding to the numbers used hereafter is as follows:—

| Solvent number | Composition |
|---|---|
| 1 | Technical amyl acetate. |
| 2 | 50 parts toluol, 6.4 parts alcohol (specially denatured formula 3A), 6.4 parts butanol, 6.4 parts ethyl acetate, 30.8 parts butyl acetate |
| 3 | 70 parts toluol, 10 parts alcohol (specially denatured formula 3A), 10 parts ethyl acetate, 10 parts cellosolve |
| 4 | 65 parts toluene, 10 parts butanol, 25 parts butyl acetate |

Plasticizers

I have found that in some cases it may be desirable to use a plasticizer in addition to chlorinated diphenyl in the lacquers made in accordance with my invention in order to increase the plasticity of the dried lacquer film. As examples of the plasticizers which may be used, I suggest either dibutyl phthalate or tricresyl phosphate (also known as lindol). In some cases, however, I have found that castor oil or triphenyl phosphate may be employed. In addition to increasing the plasticity of the dried film, I have found that additional compatibility may be obtained by the use of these substances.

Pigments

For producing pigmented lacquers, various dyes or coloring agents may be added to the clear lacquer. Pigments such as zinc oxide, lithopone, chrome yellow, chrome green, prussian blue or lampblack and others may be combined with my clear lacquers to produce various colored or black lacquers. These materials are usually incorporated by grinding the pigment and the clear lacquer together in a pebble or ball mill, or preferably by making up a stock pigment—chlorinated diphenyl base mixture with sufficient solvent to lower the viscosity to a workable value. Pigmentation of a lacquer is then carried out by adding sufficient pigment base to the lacquer in known manner.

The following examples are given as illustrating only a few of the possible lacquer combinations containing nitrocellulose and chlorinated diphenyl:

Example I

A clear lacquer in which the non-volatile part is composed of two components may be made by adding chlorinated diphenyl containing 54% chlorine or preferably a solution of chlorinated diphenyl in the solvent to a 20% nitrocellulose solution in the above mentioned solvent until the composition of the non-volatile part of the lacquer contains, say, 30% of the chlorinated diphenyl and 70% of nitrocellulose. The above lacquer is represented by the point marked M in Fig. 1. If desired, the composition of the non-volatile part of the lacquer may be made to contain up to 40% of chlorinated diphenyl which is the approximate compatibility limit of these materials. In either case the amount of solvent may be further increased or decreased by using a nitrocellulose solution of greater strength or by addition of solvent as desired and a viscosity obtained which will render the lacquer suitable for the usual methods of application desired. Pigmented lacquers may be made by combining the appropriate pigment base with the clear lacquer in a ball or pebble mill.

*Example II*

In place of the chlorinated diphenyl mentioned in Example I above, a chlorinated diphenyl containing a higher percentage of chlorine may be used. When using a chlorinated diphenyl containing, say, 62% of chlorine in combination with nitrocellulose in a two-component lacquer, the compatibility limit is somewhat less than when the chlorinated diphenyl contains 54% chlorine and therefore in order to obtain a clear film I may use up to 32% of this chlorinated diphenyl with 68% of nitrocellulose in the non-volatile part of the lacquer. This lacquer is compounded preferably by adding, say, a 50% solution of the chlorinated diphenyl in the solvent to a 20% solution of nitrocellulose in the same solvent until the non-volatile part of the lacquer contains 30% of the chlorinated diphenyl and 70% of nitrocellulose. By adding 60 parts of a 50% solution of chlorinated diphenyl containing 62% of chlorine to 350 parts of a 20% solution of nitrocellulose, 410 parts of a clear lacquer will be obtained in which the non-volatile part will contain 30% of chlorinated diphenyl and 70% of nitrocellulose. This lacquer is also represented by the point M in Fig. 1. This lacquer will contain 24.39% of non-volatile and 75.61% of volatile constituents. Pigmentation of this lacquer can be carried out in the known manner, and further addition of mixed solvents made if necessary to reduce the viscosity to a workable value.

*Example III*

As illustrating a lacquer consisting of three components in the non-volatile part, I may add to 250 parts of a 20% solution of nitrocellulose in the mixed solvent, 80 parts of a 50% solution of de-waxed dammar and 10 parts of chlorinated diphenyl containing 54% chlorine and obtain 340 parts of a clear lacquer in which the non-volatile part is composed of 50% nitrocellulose, 40% de-waxed dammar, and 10% of chlorinated diphenyl. The non-volatile part of the lacquer is thus 29.41% and the volatile part 70.59% of the mixed lacquer. Further addition of mixed solvent may be made to reduce viscosity, and pigments added in the customary manner. The above lacquer is represented by the point N in Fig. 1. It will, of course, be apparent that other points in the area of Fig. 1 marked "A=area of compatible compositions" can be chosen and a great number of lacquers formulated corresponding to these various compositions.

*Example IV*

To 220 parts of a 20% solution of nitrocellulose in the mixed solvent add 72 parts of a 50% solution of de-waxed dammar and 40 parts of a 50% solution of chlorinated diphenyl containing 62% chlorine. The non-volatile part of this lacquer will contain 44% nitrocellulose, 36% de-waxed dammar and 20% chlorinated diphenyl, and will be represented by the point marked O in Fig. 1. Addition of mixed solvent and pigment may be made in the usual manner. By varying the composition of the non-volatile part of the lacquer as indicated by points in the area of compatible compositions in Fig. 1, other useful lacquers may be formulated.

*Example V*

Other resins may be incorporated into the non-volatile part of my lacquer by a similar procedure. Figs. 1 and 2 illustrate two types of compatibility diagrams obtained with two types of chlorinated diphenyl and various resins. These figures also show the effect of various solvents on the compatibility. By choosing other types of chlorinated diphenyl in which, as has already been mentioned, the chlorine content may vary between, say, 15 and 68 per cent, various other lacquers may be formulated. I may also use other resins than those already specifically employed and thus make other types of lacquers or coating compositions. As illustrated by Figs. 1 and 2, the compatibility diagram of three-component compositions will in general be different for each resin employed and also will vary somewhat for each solvent type employed. Fig. 1 represents what may be called the dammar type of diagram and Fig. 2 the ester gum type. Thus far all of the known compatibility curves employing chlorinated diphenyl fall into one of these types.

*Example VI*

The examples previously discussed were cases in which the chlorinated diphenyl played the role of a plasticizer or softener. That it may also be useful as a resin is shown by the three solid curves in Fig. 3. These curves show the limiting compatibility ratio of a chlorinated diphenyl containing 62% of chlorine to nitrocellulose as the per cent of three well known plasticizers or softeners in the film is increased. The two broken curves in the same figure show the effect of the two resins, dammar and ester gum. It will be noted that the resin dammar causes only a slight increase in compatibility while the resin ester gum causes an actual decrease in compatibility.

In formulating a lacquer according to the curves in Fig. 3, it is necessary to choose a ratio of the chlorinated diphenyl to nitrocellulose lying below the compatibility curve of the particular plasticizer (or resin) which it is desired to use. For example, a non-volatile film composition indicated by the point P would contain 1.5 times as much chlorinated diphenyl (62% chlorine) as nitrocellulose, together with 17.5% of lindol. By weight this film would contain 49.5 parts of the chlorinated diphenyl, 33 parts of nitrocellulose and 17.5 parts of lindol. Combination of these ingredients to form the lacquer would be effected by mixing together solutions of these substances in the solvent chosen as has already been mentioned.

While I have described my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

Having now particularly described my invention, what I desire to claim is:

1. A coating composition containing nitrocellulose and chlorinated diphenyl.
2. A coating composition containing nitrocellulose, chlorinated diphenyl and a resin.
3. A coating composition containing nitrocellulose, chlorinated diphenyl and a resin compatible therewith.
4. A coating composition containing nitrocellulose and a chlorinated diphenyl having a chlorine content between 15% and 68% chlorine.
5. A coating composition containing nitrocellulose, chlorinated diphenyl, a resin and a plasticizer.
6. A coating composition containing nitrocellulose, chlorinated diphenyl, and a resin as substantially non-volatile constituents dissolved in a volatile solvent.
7. A nitrocellulose lacquer containing a plasticizer comprising chlorinated diphenyl.
8. A nitrocellulose lacquer containing a plasticizer comprising a chlorinated diphenyl having a chlorine content of approximately 54% of chlorine.
9. A nitrocellulose lacquer containing a resin comprising a chlorinated diphenyl.
10. A nitrocellulose lacquer containing a resin comprising a chlorinated diphenyl having a chlorine content of around 62%.
11. A plastic body comprising nitrocellulose and a chlorinated diphenyl.
12. A coating composition comprising nitrocellulose and chlorinated diphenyl.
13. A coating composition comprising nitrocellulose and chlorinated diphenyl, the latter being in compatible proportions in said coating composition.
14. A coating composition comprising nitrocellulose, chlorinated diphenyl and resin in compatible proportions.

RUSSELL L. JENKINS.